(12) United States Patent
Pett et al.

(10) Patent No.: US 10,066,109 B2
(45) Date of Patent: Sep. 4, 2018

(54) ARTICLES INCLUDING NANOSILICA-BASED PRIMERS FOR POLYMER COATINGS AND METHODS

(75) Inventors: Todd G. Pett, Minneapolis, MN (US); Timothy J. Hebrink, Scandia, MN (US); Naiyong Jing, Woodbury, MN (US); Justin A. Riddle, St. Paul, MN (US); David Scott Thompson, West Lakeland, MN (US); Andrew K. Hartzell, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 627 days.

(21) Appl. No.: 13/642,341

(22) PCT Filed: Apr. 20, 2011

(86) PCT No.: PCT/US2011/033262
§ 371 (c)(1),
(2), (4) Date: Oct. 19, 2012

(87) PCT Pub. No.: WO2011/137005
PCT Pub. Date: Nov. 3, 2011

(65) Prior Publication Data
US 2013/0040126 A1 Feb. 14, 2013

Related U.S. Application Data

(60) Provisional application No. 61/328,939, filed on Apr. 28, 2010, provisional application No. 61/360,145, (Continued)

(51) Int. Cl.
*C09D 5/00* (2006.01)
*G02B 3/08* (2006.01)
(Continued)

(52) U.S. Cl.
CPC ............... *C09D 5/002* (2013.01); *C09D 1/00* (2013.01); *C09J 183/04* (2013.01); *G02B 3/08* (2013.01);
(Continued)

(58) Field of Classification Search
CPC ....... C08L 83/04–83/08; C09D 183/04; C09D 1/00; C09J 183/04; C09J 1/00; C08K 2003/023
See application file for complete search history.

(56) References Cited

U.S. PATENT DOCUMENTS 3,301,741 A 1/1967 Hendrickson
3,354,022 A 11/1967 Dettre
(Continued)

FOREIGN PATENT DOCUMENTS

CN 1564742 1/2005
CN 1539888 10/2014
(Continued)

OTHER PUBLICATIONS

Oxford English Dictionary—sinter definition, 1989, Oxford University Press, second edition.*
(Continued)

*Primary Examiner* — Elizabeth A Robinson
(74) *Attorney, Agent, or Firm* — Adrian L. Pishko; Gregory D. Allen

(57) ABSTRACT

The present disclosure provides articles that include polymer coatings on substrates primed with a primer coating containing silica nanoparticles, and methods of coating. The polymer coating is preferably a silicone-based polymeric material.

9 Claims, 1 Drawing Sheet

Related U.S. Application Data filed on Jun. 30, 2010, provisional application No. 61/390,491, filed on Oct. 6, 2010.

(51) Int. Cl.

| | | |
|---|---|---|
| *C09D 1/00* | (2006.01) | |
| *C09J 183/04* | (2006.01) | |
| C08L 83/04 | (2006.01) | |
| C08L 83/08 | (2006.01) | |
| C09D 183/04 | (2006.01) | |
| C08L 83/06 | (2006.01) | |

(52) U.S. Cl.
CPC .............. *C08L 83/04* (2013.01); *C08L 83/06* (2013.01); *C08L 83/08* (2013.01); *C09D 183/04* (2013.01); *Y10T 428/249969* (2015.04)

(56) References Cited

U.S. PATENT DOCUMENTS

| | | |
|---|---|---|
| 3,931,428 A | 1/1976 | Reick |
| 4,590,117 A | 5/1986 | Taniguchi |
| 4,683,160 A | 7/1987 | Bloch |
| 4,816,333 A * | 3/1989 | Lange .................... C03C 17/23 |
| | | 428/329 |
| 4,916,169 A | 4/1990 | Boardman |
| 4,944,514 A | 7/1990 | Suiter |
| 4,986,496 A | 1/1991 | Marentic |
| 5,069,403 A | 12/1991 | Marentic |
| 5,073,404 A | 12/1991 | Huang |
| 5,091,483 A * | 2/1992 | Mazurek .............. C07F 7/0854 |
| | | 525/474 |
| 5,120,693 A * | 6/1992 | Connolly et al. ............... 502/64 |
| 5,133,516 A | 7/1992 | Marentic |
| 5,145,886 A | 9/1992 | Oxman |
| 5,175,030 A | 12/1992 | Lu |
| 5,217,805 A | 6/1993 | Kessel |
| 5,221,497 A | 6/1993 | Watanabe |
| 5,378,535 A | 1/1995 | Moncur |
| 5,435,816 A | 7/1995 | Spurgeon |
| 5,480,596 A | 1/1996 | Okubo |
| 5,505,789 A * | 4/1996 | Fraas ....................... F24J 2/085 |
| | | 136/246 |
| 5,644,014 A * | 7/1997 | Schmidt .............. C09D 183/08 |
| | | 528/10 |
| 5,667,595 A | 9/1997 | Vaverka |
| 5,858,468 A | 1/1999 | Byrd |
| 5,972,809 A | 10/1999 | Faler |
| 6,040,053 A | 3/2000 | Scholz |
| 6,046,250 A | 4/2000 | Boardman |
| 6,117,555 A | 9/2000 | Fujimori |
| 6,132,861 A | 10/2000 | Kang |
| 6,180,181 B1 | 1/2001 | Verardi |
| 6,244,740 B1 | 6/2001 | Wagner |
| 6,251,523 B1 | 6/2001 | Takahashi |
| 6,376,569 B1 | 4/2002 | Oxman |
| 6,391,141 B2 | 5/2002 | Boaz |
| 6,480,596 B1 | 11/2002 | Min |
| 6,495,624 B1 | 12/2002 | Brown |
| 6,511,701 B1 | 1/2003 | Divigalpitiya |
| 6,573,328 B2 | 6/2003 | Kropp |
| 6,730,397 B2 | 5/2004 | Melancon |
| 6,783,349 B2 | 8/2004 | Neavin |
| 6,800,354 B2 | 10/2004 | Baumann |
| 6,926,952 B1 | 8/2005 | Weber |
| 6,929,849 B2 | 8/2005 | Koskenmaki |
| 7,070,850 B2 | 7/2006 | Dietz |
| 7,070,859 B2 | 7/2006 | Imanaka |
| 7,074,463 B2 | 7/2006 | Jones |
| 7,215,473 B2 | 5/2007 | Fleming |
| 7,368,655 B2 | 5/2008 | Blieske |
| 7,486,019 B2 | 2/2009 | Padiyath |
| 7,575,655 B2 | 8/2009 | Kuhn |
| 2001/0051213 A1 | 12/2001 | Schulz |
| 2002/0045045 A1 | 4/2002 | Adams |
| 2002/0099161 A1* | 7/2002 | Mager .................... C08G 77/06 |
| | | 528/10 |
| 2002/0129850 A1 | 9/2002 | Nomura |
| 2003/0013795 A1 | 1/2003 | Nun |
| 2004/0068035 A1 | 4/2004 | Paiva |
| 2005/0064183 A1* | 3/2005 | Lunsford et al. ............. 428/354 |
| 2005/0178428 A1 | 8/2005 | Laaly |
| 2005/0223945 A1 | 10/2005 | Baumgart |
| 2006/0062937 A1 | 3/2006 | Padiyath |
| 2006/0204655 A1 | 9/2006 | Takahashi |
| 2006/0225776 A1 | 10/2006 | Nemazi |
| 2006/0234605 A1 | 10/2006 | Bryan |
| 2006/0246297 A1* | 11/2006 | Sakoske ................. C03C 17/04 |
| | | 428/426 |
| 2007/0257400 A1 | 11/2007 | Stenzel |
| 2007/0292623 A1 | 12/2007 | Lin |
| 2008/0135091 A1 | 6/2008 | Cheng |
| 2009/0283133 A1 | 11/2009 | Hebrink |
| 2009/0283144 A1 | 11/2009 | Hebrink |
| 2010/0051093 A1 | 3/2010 | Harder |
| 2010/0151231 A1 | 6/2010 | Matsuo |
| 2010/0173167 A1 | 7/2010 | Vissing |
| 2010/0180928 A1 | 7/2010 | Raymond |
| 2010/0266836 A1 | 10/2010 | Campazzi |
| 2011/0033694 A1 | 2/2011 | Jing |
| 2011/0206923 A1 | 8/2011 | Liu |
| 2011/0206924 A1 | 8/2011 | Liu |
| 2011/0223434 A1 | 9/2011 | Roehrig |
| 2012/0018482 A1 | 1/2012 | Pepin |
| 2012/0199198 A1 | 8/2012 | Hebrink |
| 2012/0276369 A1 | 11/2012 | Jing |
| 2013/0010364 A1 | 1/2013 | Hebrink |
| 2013/0040073 A1 | 2/2013 | Pett |

FOREIGN PATENT DOCUMENTS

| | | |
|---|---|---|
| EP | 0145308 | 6/1985 |
| EP | 0263428 | 4/1988 |
| EP | 0424006 | 4/1991 |
| EP | 0570165 | 11/1993 |
| EP | 0834468 | 4/1998 |
| EP | 1132448 | 9/2001 |
| EP | 1362682 | 11/2003 |
| EP | 1486802 | 12/2004 |
| EP | 1690602 | 8/2006 |
| GB | 1454960 | 11/1976 |
| GB | 2041956 | 9/1980 |
| GB | 2066565 | 7/1981 |
| GB | 2137648 | 10/1984 |
| JP | 05163463 | 6/1993 |
| JP | 2007-505773 | 3/2007 |
| JP | 2009-220581 | 10/2009 |
| JP | 2009-248546 | 10/2009 |
| WO | WO 1990/15673 | 12/1990 |
| WO | WO 1997/31357 | 8/1997 |
| WO | WO 2001/68940 | 9/2001 |
| WO | WO 2003/033423 | 4/2003 |
| WO | WO 2005/035680 | 4/2005 |
| WO | WO 2007/014230 | 2/2007 |
| WO | WO 2007/015273 | 2/2007 |
| WO | WO 2008/022027 | 2/2008 |
| WO | WO 2009/029435 | 3/2009 |
| WO | WO 2009/046725 | 4/2009 |
| WO | WO 2009/111190 | 9/2009 |
| WO | WO 2009/140482 | 11/2009 |
| WO | WO 2009/141830 | 11/2009 |
| WO | WO 2010/017069 | 2/2010 |
| WO | WO 2010/056541 | 5/2010 |
| WO | WO 2010/056543 | 5/2010 |
| WO | WO 2010/056546 | 5/2010 |
| WO | WO 2011/056496 | 5/2011 |
| WO | WO 2011/081974 | 7/2011 |
| WO | WO 2012/047422 | 4/2012 |
| WO | WO 2012/047749 | 4/2012 |

(56) References Cited

FOREIGN PATENT DOCUMENTS

OTHER PUBLICATIONS

AEROSIL® fumed silica and SIPERNAT® in sealants Technical Bulletin, Jul. 1, 2015 downloaded on Sep. 29, 2017 from https://www.aerosil.com/sites/lists/RE/DocumentsSI/TB-63-AEROSIL-Fumed-Silica-and-SIPERNAT-in-Sealants-EN.pdf.*
Gelest Silane Coupling Agents product literature, 2006, Gelest Inc., pp. 1-56.*
Brook, *Silicon in Organic, Organometallic, and Polymer Chemistry*, Chapter 9.6.3: Oxidative Degradation, 2nd paragraph, John Wiley & Sons, Inc., p. 297, (2000).
Dolle, "Gradual Photochemical-Induced Conversion of Liquid Polydimethylsiloxane Layers to Carbon Containing Silica Coatings by VUV Irradiation at 172 nm", Langmuir, 2009, vol. 25, No. 12, pp. 7129-7134.
Frounchi, "Comparison Between Electron-Beam and Chemical Crosslinking of Silicone Rubber", Nuclear Instruments and Methods in Physics Research B, Feb. 2006, vol. 243, No. 2, pp. 354-358.
Mark, *Physical Properties of Polymers Handbook*, Second Edition, (2007), Springer Science + Business Media, LLC, p. 882.
Scheydecker, "Reduction of Reflection Losses of PV-Modules by Structured Surfaces", Solar Energy, Aug. 1994, vol. 53, No. 2, pp. 171-176.
Winter, "Design of Dies for the Extrusion of Sheets and Annular Parisons: The Distribution Problem", Polymer Engineering & Science, Apr. 1986, vol. 26, No. 8, pp. 543-553.
Bragg, "The Form Birefringence of Macromolecules", Acta. Cryst., 1953, vol. 6, pp. 865-867.
International Search Report for PCT/US2011/033262, 4 pages.
Pope, E.J.A., et al., "SOL-GEL Processing of Silica, II. The role of the catalyst," Journal of Non-Crystalline Solids, vol. 87, (1986), pp. 185-198.

* cited by examiner

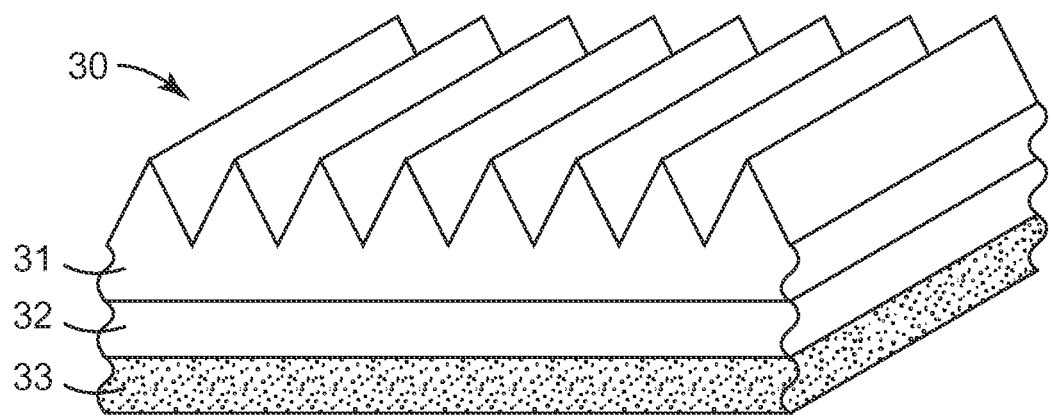

ARTICLES INCLUDING NANOSILICA-BASED PRIMERS FOR POLYMER COATINGS AND METHODS

BACKGROUND

Silicone-based materials are often used in our daily life. For example, silicone elastomers are known for their stability under long-term ultra-violet light exposure. They can be optically clear and tough, which makes them well suited for outdoor use. A common problem with this type of material is adhesion to a substrate surface. Therefore, a need exists for primers that are effective for silicone-based materials on a wide variety of substrates.

SUMMARY

The present disclosure provides articles that include polymer coatings on substrates primed with a primer coating containing silica nanoparticles, and methods of coating. The polymer coating is preferably a silicone-based polymeric material.

In one embodiment, there is a coated article comprising a substrate surface, a nanoparticle-containing primer disposed on the substrate surface, and a silicone-based material bonded to the nanoparticle-containing primer, wherein the nanoparticle-containing primer comprises agglomerates of silica nanoparticles, said agglomerates comprising a three-dimensional porous network of silica nanoparticles, and the silica nanoparticles being bonded to adjacent silica nanoparticles.

In another embodiment, there is coated article comprising a substrate surface, a nanoparticle-containing primer disposed on the substrate surface, a silicone tie layer disposed on the nanoparticle-containing primer, and a silicone-based material bonded to the silicone tie layer, wherein the tie layer is at least one of UV or thermally cured, and wherein the nanoparticle-containing primer comprises agglomerates of silica nanoparticles, said agglomerates comprising a three-dimensional porous network of silica nanoparticles, and the silica nanoparticles being bonded to adjacent silica nanoparticles.

In some embodiments, the silica nanoparticles are spherical and have a have an average particle diameter of less than 40 nanometers (preferably, less than 20 nanometers, more preferably, less than 10 nanometers, and even more preferably, less than 5 nanometers).

In some embodiments, the substrate surface of the coated article includes a metal surface, a glass surface, a ceramic surface, an organic polymeric surface, a UV stable polymer surface, a UV stable polymeric mirror film surface, a fluoropolymer film surface, a PVDF/PMMA polymer blend film surface, a paper surface, a fabric surface, or a combination thereof.

In some embodiments, the silicone-based material is a surface-structured silicone-based material. In some embodiments, the surface structures comprise micro-sized structures, nano-sized structures, or both. In some embodiments, the silicone-based material has a smooth surface.

In some embodiments, the silicone-based material is substantially free of catalysts and initiators. As used herein, a composition is "substantially free of catalysts and initiators" if the composition does not include any catalyst and initiator or does not include an "effective amount" of a catalyst and/or initiator. A particular catalyst or initiator is present at an "effective amount" if the amount of catalyst or initiator reduces the cure time of the composition by at least 10% relative to the cure time for the same composition at the same curing conditions, absent that catalyst or initiator.

In some embodiments, the silicone-based material is a nonfunctionalized silicone-based material. In some embodiments, the silicone-based material comprises a siloxane backbone and at least one functional group. In some embodiments, all functional groups are hydroxy groups. In some embodiments, the crosslinked silicone-based material is a silicone pressure sensitive adhesive. In some embodiments, the crosslinked silicone-based material is a foam (e.g., a silicone foam). In some embodiments, the crosslinked silicone-based material is a non-tacky foam. In some embodiments, the silicone-based material is a polysiloxane (e.g., a poly(dialkyl siloxane) or a poly(dimethylsiloxane)). In some embodiments, the polysiloxane bears aromatic groups. In some embodiments, the silicone-based material further comprises a tackifier (e.g., an MQ resin tackifier). In some embodiments, the silicone-based material is a non-tacky film.

In some embodiments, the silicone-based material is a blend. In some embodiments, the silicone-based material is a blend of fluorosilicone and a nonfluorinated silicone. In some embodiments, the silicone-based material is a release material. In some embodiments, the silicone-based material is a pressure sensitive adhesive.

The present disclosure also provides a laminated article comprising two substrates, a nanoparticle-containing primer layer disposed on one surface of each of the two substrates, and a silicone-based material bonded between the nanoparticle-containing primer layers, thereby forming a laminate.

Embodiments of silicone-based materials described herein are useful, for example, in applications of light capture, anti-reflection, light redirection, light diffusion, hydrophobic surfaces, hydrophilic surfaces, light guiding, light collimation, light concentration, Fresnel lens, retro-reflection, drag reduction, air bleed adhesives, release liner, abrasion resistance, and anti-fouling.

The present disclosure also provides methods of coating. In one embodiment, there is a method of coating a substrate surface, the method comprising: applying a primer coating composition to the substrate surface to form a primed surface; wherein applying a primer coating composition to the substrate surface comprises: contacting the substrate surface with a nanoparticle-containing coating composition, wherein the nanoparticle-containing coating composition comprises: an aqueous dispersion having a pH of less than 5 comprising silica nanoparticles (preferably, spherical particles having average particle diameters of less than 40 nanometers), and an acid having a $pK_a$ of ≤3.5; and drying the nanoparticle-containing coating composition to provide a silica nanoparticle primer coating on the substrate surface. The method further includes contacting the primed surface (preferably having Si—OH groups thereon) with a silicone-containing coating composition; and curing the silicone-containing coating composition to form a crosslinked silicone-containing coating.

In certain embodiments, the nanoparticle-containing primer coating composition includes an aqueous dispersion having a pH of less than 5 comprising spherical silica nanoparticles having average particle diameters of less than 20 nanometers (more preferably less than 10 nanometers, and even more preferably less than 5 nanometers), and an acid having a $pK_a$ of ≤3.5 (preferably <2.5, more preferably less than 1, and even more preferably less than 0). A preferred nanoparticle-containing primer comprises agglomerates of silica nanoparticles comprising a three-dimensional porous network of silica nanoparticles, and the silica nanoparticles being bonded to adjacent silica nanoparticles.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a primer composition that comprises "an" acid can be interpreted to mean that the primer composition includes "one or more" acids.

As used herein, the term "or" is generally employed in its sense including "and/or" unless the content clearly dictates otherwise. The term "and/or" means one or all of the listed elements or a combination of any two or more of the listed elements.

Herein, all numbers are assumed to be modified by the term "about" and preferably by the term "exactly." Notwithstanding that the numerical ranges and parameters setting forth the broad scope of the invention are approximations, the numerical values set forth in the specific examples are reported as precisely as possible. All numerical value, however, inherently contain certain errors necessarily resulting from the standard deviation found in their respective testing measurements.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 1 is a perspective view of an exemplary surface-structured crosslinked silicone described herein attached to a substrate with a primer layer.

DETAILED DESCRIPTION OF ILLUSTRATIVE EMBODIMENTS

The present disclosure provides articles that include polymer coatings on substrates primed with a primer coating containing silica nanoparticles, and methods of coating.

In one aspect, the present disclosure also provides an article comprising a substrate having a first major surface with a silicone-based material described herein on at least a portion of the first major surface. For example, FIG. 1 illustrates a perspective view of an exemplary film 30 having a surface-structured, crosslinked silicone-based material 31 disposed on a substrate 33 with a primer coating 32 of the present invention between the crosslinked silicone-based material and the substrate surface. In some embodiments, the substrate has a second major surface generally opposed the first major surface and the silicone-based material described herein on at least a portion of the second major surface. The surface of the silicone-based material may be smooth or structured.

In some embodiments, there are two substrates with primer (the primer of this invention) on the surface, bonded together with a layer of a crosslinked silicone-based material, such to form a laminate article.

In some embodiments, the article is an adhesive, wherein the silicone-based material described herein is a pressure sensitive adhesive adhered to at least a portion of the primed first major surface of the substrate.

In some embodiments, the article is a release liner, wherein the silicone-based material described herein is a release material adhered to at least a portion of the primed first major surface of the substrate.

Polymer Coatings

The polymer coatings of the present invention preferably include a silicone-based material. Silicones are largely-inert, synthetic compounds with a wide variety of forms and uses. Typically, heat-resistant, nonstick, and rubber-like, they are commonly used in cookware, medical applications, sealants, adhesives, lubricants, insulation, and breast implants. Some common forms of silicone include oils, fluids, gums greases, elastomers (e.g., silicone rubber), and resins. Silicone elastomers are known for their stability under long-term ultraviolet light exposure, and they can be optically clear and tough, which makes them well suited for outdoor use.

Silicones typically have the formula $(R_mSi(O)4-m/2)n$, where m=1-3 and n=2. The most common are the poly (dimethylsiloxanes) (PDMS). Several reaction types are generally employed for the formation of silicone three-dimensional networks (i.e., crosslinked silicones): peroxide-induced free-radical processes (which typically also require thermal cycling), hydrosilylation addition reactions (which typically require a catalyst and thermal cycle), and condensation reactions (typically requiring a catalyst and moisture). Silicones have also been crosslinked using radiation (e.g., e-beam, gamma, UV) to produce free radicals or to induce photoinitiated reactions.

Generally, the crosslinked siloxane networks of the silicone-based materials can be formed from either functional or non-functional silicone materials. Examples of useful silicone materials include the general silicone materials listed in the previous paragraph as well as others, for example, UV-cured silicones as disclosed in U.S. Pat. Nos. 6,376,569, 6,046,250 5,145,886, and 4,916,169; thermal-cured silicones disclosed in U.S. Pat. No. 6,573,328 (as well as the silicone materials described in the background of this patent); low-surface-energy silicone-based protective materials as disclosed in U.S. Pat. No. 5,858,468; as well as commercially available silicone-based materials such as "SYLGARD 184" from Dow Corning Corporation, Midland, Mich., "SYLGARD 182" from Dow Corning, "RTV615" from Momentive Performance Materials, Inc, Watertown, N.Y., a UV dual cure silicone adhesive sealant "SS-5088" from Silicone Solutions, Inc. Twinsburg, Ohio, "3112 RTV RUBBER" from Dow Corning Corporation, "734 FLOWABLE SEALANT" from Dow Corning Corporation.

In some embodiments, the silicone-based material can be nonfunctionalized and can be crosslinked by use of peroxide initiators or high energy radiation (e.g., electron beam irradiation) which is described below. The nonfunctionalized silicone-based materials can be a linear material described by the following formula illustrating a siloxane backbone with aliphatic and/or aromatic substituents:

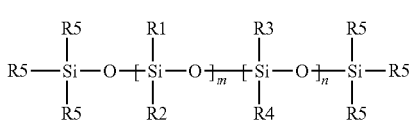
(1)

wherein R1, R2, R3, and R4 are independently selected from the group consisting of an alkyl group and an aryl group, each R5 is an alkyl group and n and m are integers, and at least one of m or n is not zero. In some embodiments, at least one of the alkyl or aryl groups may contain a halogen substituent (e.g., fluorine). For example, in some embodiments, at least one of the alkyl groups may be —CH$_2$CH$_2$C$_4$F$_9$.

In some embodiments, R5 is a methyl group (i.e., the nonfunctionalized silicone material is terminated by trimethylsiloxy groups). In some embodiments, R1 and R2 are alkyl groups and n is zero (i.e., the material is a poly (dialkylsiloxane)). In some embodiments, the alkyl group is a methyl group (i.e., poly(dimethylsiloxane) ("PDMS")). In some embodiments, R1 is an alkyl group, R2 is an aryl group, and n is zero (i.e., the material is a poly(alkylarylsiloxane)). In some embodiments, R1 is methyl group and R2 is a phenyl group (i.e., the material is poly(methylphenylsiloxane)). In some embodiments, R1 and R2 are alkyl groups and R3 and R4 are aryl groups (i.e., the material is a poly(dialkyldiarylsiloxane)). In some embodiments, R1 and R2 are methyl groups, and R3 and R4 are phenyl groups (i.e., the material is poly(dimethyldiphenylsiloxane) or poly (methylphenylsiloxane)).

In some embodiments, the nonfunctionalized silicone materials may be branched. For example, at least one of the R1, R2, R3, and/or R4 groups may be a linear or branched siloxane with alkyl or aryl (including halogenated alkyl or aryl) substituents and terminal R5 groups.

As used herein, "nonfunctional groups" are either alkyl or aryl groups consisting of carbon, hydrogen, and in some embodiments, halogen (e.g., fluorine) atoms. As used herein, a "nonfunctionalized silicone material" is one in which the R1, R2, R3, R4, and R5 groups are nonfunctional groups.

Generally, functional silicone systems include specific reactive groups attached to the siloxane backbone of the starting material (e.g., hydrogen, hydroxyl, vinyl, allyl, or acrylic groups). As used herein, a "functionalized silicone material" is one in which at least one of the R-groups of Formula 2 is a functional group.

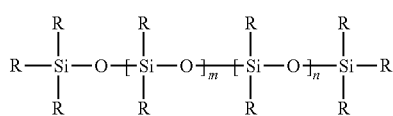
(2)

In some embodiments, a functional silicone material is one is which at least 2 of the R-groups are functional groups. Generally, the R-groups of Formula 2 may be independently selected. In some embodiments, the only functional groups present are hydroxyl groups (e.g., silanol terminated polysiloxanes (e.g., silanol terminated poly dimethyl siloxane)).

In addition to functional R-groups, the R-groups may be nonfunctional groups (e.g., alkyl or aryl groups, including halogenated (e.g., fluorinated) alky and aryl groups). In some embodiments, the functionalized silicone materials may be branched. For example, at least one of the R groups may be a linear or branched siloxane with functional and/or non-functional substituents.

Generally, lower molecular weight, lower viscosity materials are referred to as fluids or oils, while higher molecular weight, higher viscosity materials are referred to as gums; however, there is no sharp distinction between these terms. Typically, the terms "fluid" and "oil" refer to materials having a dynamic viscosity at 25° C. of no greater than 1,000,000 mPa·sec (e.g., less than 600,000 mPa·sec), while materials having a dynamic viscosity at 25° C. of greater than 1,000,000 mPa·sec (e.g., at least 10,000,000 mPa·sec) are referred to as "gums."

Crosslinked silicone-based material described herein may also comprise inorganic particles (including nanoparticles) therein. Examples of suitable inorganic materials include silica, zirconia, titania, and combination thereof. Typically, it is desirable for the inorganic particles to have a size not greater than 2 micrometers, although larger sizes may also be useful. Silica particles are preferably not greater than 1 micrometer although larger sizes may also be useful. Preferably, particles made of other materials are in the nanometer size range, e.g., are in the range of from about 5 nm up to about 50 nm). Silica particles in the nanometer size range may also be useful. Such particles, especially nanoparticles, may also be loaded into the silicone elastomeric material in the range of from 0 wt. % to about 60 wt. %.

In some embodiments, the silicone based materials are blends (e.g., blends of fluorinated silicones and nonfluorinated silicones). For example, a curable composition can include an ethylenically unsaturated fluoroorganopolysiloxane polymer; a non-fluorinated organopolysiloxane polymer comprising an average of at least two ethylenically unsaturated organic groups; a hydrosilation catalyst; and at least one crosslinker. The crosslinker can be selected from the group consisting of a fluoroorganohydrogenpolysiloxane and an organohydrogenpolysiloxane. In some embodiments, the composition comprises both the fluoroorganohydrogenpolysiloxane and the organohydrogenpolysiloxane crosslinkers. In some embodiments, the non-fluorinated organopolysiloxane polymer has a vinyl equivalent weight of no greater than 60,000 grams per equivalent. In some embodiments, the non-fluorinated organopolysiloxane polymer has a vinyl equivalent weight of 2000 to 5000 grams per equivalent. In some embodiments, the ethylenically unsaturated fluoroorganopolysiloxane polymer comprises an average of at least two ethylenically unsaturated organic groups. In some embodiments, fluoroorganopolysiloxane polymer comprises a siloxane backbone and pendant C1 to C6 perfluoroalkyl groups bonded to backbone with a linking group. In some embodiments, the linking group is an alkylene group comprising at least two carbon atoms. In some embodiments, the alkylene linking group is —C$_2$H$_4$—. In some embodiments, the pendant perfluoroalkyl group is —C$_4$F$_9$. In some embodiments, the hydrosilation catalyst comprises platinum. In some embodiments, the curable release composition further comprises a cure inhibitor.

In some embodiments, silicone material comprises a blend of a fluoro-functional silicone release polymer and a second fluoropolymer. In some embodiments, the second fluoropolymer is a linear fluoropolymer. In some embodiments, the weight ratio of the fluoro-functional silicone release polymer to the linear fluoropolymer is no greater than 10:1. In some embodiments, the weight ratio of the fluoro-functional silicone release polymer to the linear fluoropolymer is no greater than no greater than 1:10. In some embodiments, the linear fluoropolymer is a non-silicone, linear fluoropolymer. In some embodiments, the linear fluoropolymer is a fluoroacrylate polymer. In some embodiments, the fluoroacrylate polymer is derived from at least one C4MH monomer. In some embodiments, the linear fluoropolymer is a fluoroolefin-based polymer.

In another aspect, the present disclosure provides a release material comprising a blend of a fluoro-functional silicone release polymer and a fluoroolefin-based polymer. In some embodiments, the fluoroolefin-based polymer comprises the reaction product of at least one monomer selected from the group consisting of tetrafluoroethylene, hexafluoropropylene, vinyl fluoride, and vinylidene fluoride. In some embodiments, the fluoroolefin-based polymer is a terpolymer of tetrafluoroethylene, hexafluoropropylene, and vinylidene fluoride. In some embodiments, the fluoroolefin-based polymer is an elastomeric fluoroolefin-based polymer. In some embodiments, the fluoroolefin-based polymer is a thermoplastic fluoroolefin-based polymer.

In some embodiments the silicone-based material includes fillers. Examples of fillers include: fumed silica, fused silica powder, quartz powder, glass bubbles, milled glass fibers, carbon, diatomaceous earth, clay, carbon nanotubes, carbon black, metal oxides (e.g., iron oxide, titanium oxide, and cerium oxide) and metal carbonates (e.g., calcium carbonate and magnesium carbonate). In some embodiments, it may be desirable to include pigments, dyes, UV absorbers, and/or antioxidants in the surface-structured, crosslinked silicone-based material described herein.

In some embodiments, the silicone-based material described herein is a pressure sensitive adhesive. In some embodiments, the crosslinked material is non-tacky.

The pressure sensitive adhesives may be prepared by combining silicone materials (e.g., silicone gums or elastomers) with an appropriate tackifying resin, hot melt coating the resulting combination, and curing using electron beam (e-beam) irradiation. Other silicone pressure sensitive adhesive formulations utilizing other curing methods (e.g., peroxide, free radical, or platinum-catalyzed silicone addition) could also be used.

Generally, any known additives useful in the formulation of pressure sensitive adhesives (e.g., dyes, pigments, fillers, flame retardants, rheology modifiers, flow agents, surfactants, chopped glass fibers, and microspheres (e.g., expandable microspheres) may be also be included).

Generally, any known tackifying resin may be used (e.g., in some embodiments, silicate tackifying resins may be used). In some exemplary adhesive compositions, a plurality of silicate tackifying resins can be used to achieve desired performance.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 g/mole to 50,000 g/mole (e.g., 500 g/mole to 15,000 g/mole) and generally R' groups are methyl groups.

MQ silicate tackifying resins are copolymeric resins where each M unit is bonded to a Q unit, and each Q unit is bonded to at least one other Q unit. Some of the Q units are bonded to only other Q units. However, some Q units are bonded to hydroxyl radicals resulting in $HOSiO_{3/2}$ units (i.e., "$T^{OH}$" units), thereby accounting for some silicon-bonded hydroxyl content of the silicate tackifying resin.

The level of silicon bonded hydroxyl groups (i.e., silanol) on the MQ resin may be reduced to no greater than 1.5 weight percent (in some embodiments, no greater than 1.2 weight percent, no greater than 1 weight percent, or even no greater than 0.8 weight percent), based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylsilating reagents such as trimethylchlorosilane or trimethylsilylacetamide may be reacted with the silicate tackifying resin, a catalyst not being necessary in the latter case.

MQD silicone tackifying resins are terpolymers having M, Q and D units. In some embodiments, some of the methyl R' groups of the D units can be replaced with vinyl (CH2=CH—) groups ("$D^{Vi}$" units). MQT silicate tackifying resins are terpolymers having M, Q and T units.

Suitable silicate tackifying resins are available, for example, under the trade designations "DC2-7066" from Dow Corning Corporation; and "SR545" and "SR1000" from Momentive Performance Materials, Inc.

The silicone material, the tackifying resin, and any optional additives may be combined by any of a wide variety of known means prior to being hot melt coated and cured. For example, in some embodiments, the various components may be pre-blended using common equipment (e.g., mixers, blenders, mills, and extruders). In some embodiments, the hot melt coating process is extrusion. In such embodiments, the various components may be added together, in various combinations or individually, through one or more separate ports of an extruder, blended (e.g., melt mixed) within the extruder, and extruded to form the hot melt coated composition. Regardless of how it is formed, the hot melt coated composition may be cured through exposure to electron beam irradiation.

In some embodiments, the methods and materials of the present disclosure may be used to foam silicone. Silicone foams provide unique properties, including: resilience, wide service temperature stability (e.g., about 50° C. to about 200° C.), inertness, and inherent flame retardancy. Generally, silicone foams have been made in processes where cell growth or expansion (i.e., the foaming process) and cell stabilization (i.e., the crosslinking process) happen simultaneously. Most common cell expansion chemistries for silicone foams rely on chemical blowing agents (e.g., azo containing compounds or condensed gas by-product from crosslinking reactions).

In contrast, through the use of the electron beam (e-beam) curing process of the present disclosure, the cell expansion or foaming process and cell stabilization or crosslinking process can be independently optimized. In some embodiments, this can lead to improved control over cell structures with uniform distribution of foam cell sizes. The E-beam cured silicone foams can be made with microspheres, including both rigid non-polymeric hollow microspheres (e.g., glass bubbles), polymeric microspheres, including thermally expandable polymeric microspheres), and include chopped glass fibers, and/or nanoparticles.

The silicone material, the microsphere, and any optional additives may be combined by any of a wide variety of known means prior to being hot melt coated and cured. For example, in some embodiments, the various components may be pre-blended using common equipment (e.g., mixers, blenders, mills, and extruders). In some embodiments, the hot melt coating process is extrusion. In such embodiments, the various components may be added together, in various combinations or individually, through one or more separate ports of an extruder, blended (e.g., melt mixed) within the extruder, and extruded to form the hot melt coated composition. Regardless of how it is formed, the hot melt coated composition may be cured through exposure to e-beam irradiation.

In embodiments where the silicone-based material is structured, the procedures for making a structured silicone utilize a tool that will impart the negative structure in the silicone surface before the silicone is crosslinked (for example, using electron beam radiation). The tooling can be of a variety of forms and materials. Commonly the form of the tooling will either be a sheet, roll, belt or roll of film. Tooling is generally constructed of material that fall either into the category of metal or polymer but could potentially include ceramic or other suitable material. For metal tools, the metal is generally diamond-machined, embossed, knurled, sandblasted, etc., to form the surface structure. In the case of polymer tools the structured polymer surface is generally formed by extrusion replication where a thermoplastic resin such as polypropylene is extruded using standard extrusion equipment and fed through a die and into a nip with a machined metal tool roll and a rubber roll. The molten polymer is quenched while in contact with a tool surface which then releases from the tool roll and is wound on a roll. Additional polymer tooling can be made by UV-curing acrylate functional resins against a tool followed by removal of the crosslinked structured film from the tool. The following polymers are potential options for polymer tools: polypropylene, polyethylene, polyethylene terephthalate, ethylene/octene, ethylene/hexene, other ethylene copolymers, propylene/ethylene, propylene copolymers of lower modulus, UV-curable acrylates, poly(methyl methacrylate), polycarbonate, polystyrene, styrene-co-acrylonitrile, polyurethane or other suitable materials.

Generally, the non-crosslinked silicone material is brought into intimate contact with the tooling surface by way of pressing the silicone material between the tooling and a substrate using nip rolls or a platen press. To achieve the best replication quality the silicone must be crosslinked while in contact with the tool. Therefore the silicone passes through an electron beam unit while still in contact with the tool and the primed substrate. The electron beam radiation may pass through the tooling side or the substrate side depending on the thickness and density of the tooling and the substrate. Generally it is unfavorable to irradiate through thick or very dense materials because such materials absorb the electrons before they can reach and crosslink the silicone. When the tool is metal it is best to irradiate the construction through the silicone or substrate side since metal is usually too dense to allow the radiation through unless it is very thin. One skilled in the art will be able to select the proper electron beam acceleration voltage to account for the thickness of the tooling, silicone and substrate layers and also will be able to select the proper dose to properly crosslink the silicone material.

After the silicone is crosslinked by the electron beam radiation the permanently structured silicone may be removed from the tooling. The silicone will release from the tool and stay attached to the substrate as long as there is adhesion between the silicone and the substrate, which may be enhanced using a suitable primer (discussed herein).

Additional details on surface-structured silicone-based materials can be found in co-pending application having U.S. Ser. Nos. 61/328,943, filed on Apr. 28, 2010, and 61/390,496 filed the same date as the instant application.

Primer Coatings

The primer coating is formed from a nanoparticle-containing coating composition that is coated and dried on a substrate surface. The silica nanoparticles are preferably not surface modified.

The silica particles used in the primer coating composition can be of a wide variety of shapes, including spherical or nonspherical (e.g., needle-like, rod-like, string-like, bead-chain-like, nanofilaments, elongated particles). The nonspherical or irregular shaped nanoparticles may result in the formation of voids in the coatings differently from that of spherical or regular shaped nanoparticles. Combinations of spherical and nonspherical silica nanoparticles can be used if desired.

The silica nanoparticles used in this primer composition are dispersions of submicron size silica nanoparticles in an aqueous or in a water/organic solvent mixture. The average particle size (i.e., the longest dimension of a particle, which is a diameter of a spherical particle) may be determined using transmission electron microscopy.

Generally, spherical silica nanoparticles have an average primary particle diameter of less than 40 nanometers (nm), preferably less than 20 nm, more preferably less than 10 nm, and even more preferably less than 5 nm. Although larger nanoparticles can be used if desired (e.g., those having a diameter of 50 nm or greater).

Generally, nonspherical (i.e., acicular) colloidal silica particles may have a uniform thickness of at least 2 nm (in certain embodiments at least 5 nm) and typically up to 25 nm. They may have a length, $D_1$ of at least 40 nm and typically, a length up to 500 nm (as measured by dynamic light-scattering method). The nonspherical (i.e., acicular) colloidal silica particles may have degree of elongation $D_1/D_2$ of 5 to 30, wherein $D_2$ means a diameter in nm calculated by the equation $D_2=2720/S$ and S means specific surface area in $m^2/g$ of the particle, as is disclosed in the specification of U.S. Pat. No. 5,221,497.

The smaller nanoparticles (i.e., those less than 20 nanometers), generally provide better primer coatings, when acidified, without the need for additives (e.g., tetraalkoxysilanes, surfactants, and organic solvents). Preferably, the nanoparticles generally have a surface area greater than 150 $m^2/g$ (in some embodiments, greater than 200, 300, or even greater than 400 $m^2/g$).

In certain embodiments, the particles preferably have narrow particle size distributions, that is, a polydispersity (i.e., particle size distribution) up to 2, preferably up to 1.5. If desired, larger silica particles may be added, in limited amounts that do not deleteriously decrease the coatability of the composition on a selected substrate, and do not reduce the transmissivity and/or the hydrophilicity. Thus, various sizes of particles may be used in combination. In certain embodiments, bimodal distributions of particle sizes may be used. For example, particles having an average particle size of at least 50 nm (preferably 50 to 100 nm) may be used in ratios of 0.2:99.8 to 99.8:0.2 relative to the weight of the silica nanoparticles of 40 nm or less. The larger particles are preferably used in ratios of 1:9 to 9:1 relative to the smaller particles. In certain embodiments, particles may be used that have an average particle size of 40 nm or less (preferably 0.1 to 20 wt-%) plus particles having an average particle size of 50 nm or greater (preferably 0 to 20 wt-%), wherein the sum of the two different particle sizes is 0.1 to 20 wt-%. Generally, the total weight of silica particles (regardless of size) in a primer composition of the present invention is at least 0.1 wt-%, preferably at least 1 wt-%, and more preferably at least 2 wt-%. Generally, the total weight of silica particles (regardless of size) in a primer composition of the present invention is no greater than 40 wt-%, preferably no greater than 20 wt-%, even more preferably no greater than 10 wt-%, and even more preferably no greater than 7 wt-%.

The primer compositions of the present invention are acidified. These acidified aqueous silica nanoparticle primer coating compositions, can be coated directly onto hydrophobic organic and inorganic substrates without either organic solvents or surfactants. The wetting property of these inorganic nanoparticle aqueous dispersions on hydrophobic surfaces (e.g., polyethylene terephthalate (PET) or polycarbonate (PC)) is a function of the pH of the dispersions and the $pK_a$ of the acid. The primer coating compositions are coatable on hydrophobic organic substrates when they are acidified with HCl to pH=2 to 3, and even to 4 or 5 in some embodiments. In contrast, the aqueous primer coating compositions bead up on the organic substrates at neutral or basic pH.

Inorganic silica sols in aqueous media are well known in the art and available commercially. Silica sols in water or water-alcohol solutions are available, for example, under the trade designations "LUDOX" from E.I. duPont de Nemours and Co., Inc., Wilmington, Del.; "NYACOL" from Nyacol Co., Ashland, Mass.; and "NALCO" from Ondea Nalco Chemical Co., Oak Brook, Ill. One useful silica sol is NALCO 2326 available as a silica sol with mean particle size of 5 nanometers, pH 10.5, and solid content 15% by weight. Other commercially available silica nanoparticles include "NALCO 1115" and "NALCO 1130," commercially available from NALCO Chemical Co., "REMASOL SP30," commercially available from Remet Corp., Utica, N.Y., and "LUDOX SM," commercially available from E.I. Du Pont de Nemours Co., Inc.

Useful nonspherical (i.e., acicular) silica particles may be obtained as an aqueous suspension under the trade name SNOWTEX-UP from Nissan Chemical Industries (Tokyo, Japan). The mixture consists of 20-21% (w/w) of nonspherical silica, less than 0.35% (w/w) of $Na_2O$, and water. The particles are about 9 to 15 nanometers i" diameter and have lengths of 40 to 300 nanometers. The suspension has a viscosity of <100 mPas at 25° C., a pH of about 9 to 10.5, and a specific gravity of about 1.13 at 20° C. Other useful acicular silica particles may be obtained as an aqueous suspension under the trade name SNOWTEX-PS-S and SNOWTEX-PS-M by Nissan Chemical Industries, having a morphology of a string of pearls. The mixture consists of 20-21% (w/w) of silica, less than 0.2% (w/w) of $Na_2O$, and water. The SNOWTEX-PS-M particles are about 18 to 25 nanometers in diameter and have lengths of 80 to 150 nanometers. The particle size is 80 to 150 by dynamic light scattering methods. The suspension has a viscosity of <100 mPas at 25° C., a pH of about 9 to 10.5, and a specific gravity of about 1.13 at 20° C. The SNOWTEX-PS-S has a particle diameter of 10-15 nm and a length of 80-120 nm.

Non-aqueous silica sols (also called silica organosols) may also be used and are silica sol dispersions wherein the liquid phase is an organic solvent, or an aqueous organic solvent. In the practice of this disclosure, the silica sol is chosen so that its liquid phase is typically aqueous (or less preferably) an aqueous organic solvent. It has been observed that sodium stabilized silica nanoparticles should first be acidified prior to dilution with an organic solvent (e.g., ethanol). Dilution prior to acidification may yield poor or non-uniform coatings. Ammonium stabilized silica nanoparticles may generally be diluted and acidified in any order.

The primer coating composition contains an acid or combination of acids, each having a $pK_a$ ($H_2O$) of ≤3.5, preferably <2.5, more preferably less than 1, and even more preferably less than 0. Useful acids include both organic and inorganic acids and may be exemplified by oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, and $CF_3CO_2H$. Most preferred acids include HCl, $HNO_3$, $H_2SO_4$, and $H_3PO_4$. In some embodiments, it is desirable to provide a mixture of an organic and inorganic acid. In some embodiments one may use a mixture of acids comprising those having a $pK_a$≤3.5 (preferably <2.5, more preferably less than 1, and even more preferably less than 0), optionally with minor amounts of other acids having $pK_a$'s>0. It has been found that weaker acids having a $pK_a$ of >4 (e.g., acetic acid), do not provide a uniform coatings having the desirable properties of transmissivity and/or durability. In particular, primer coating compositions with weaker acids (e.g., acetic acid) typically bead up on the surface of a substrate.

The primer coating composition generally contains sufficient acid to provide a pH of less than 5, preferably less than 4, most preferably less than 3. In some embodiments, it has been found that the pH of the coating composition can be adjusted to pH 5-6 after first reducing the pH to substantially less than 5. This allows one to coat pH-sensitive substrates.

Tetraalkoxy coupling agents, particularly tetraalkoxysilanes (e.g., tetraethylorthosilicate (TEOS)), and oligomeric forms of tetraalkoxysilane (e.g., alkyl polysilicates (e.g., poly(diethoxysiloxane))), may also be useful to improve binding between silica nanoparticles. The optimal amount of coupling agent is determined experimentally and is dependent on the coupling agent's identity, molecular weight and refractive index. The coupling agent(s), when present, are typically added to the composition at levels of up to 50 percent by weight (wt-%), often up to 20 wt-%, and in some embodiments up to 15 wt-%, relative to the amount of the silica nanoparticle concentration. In some embodiments, the coupling agent(s) are present in an amount of 0.1 wt-% to 50 wt-%, and more preferably 1 wt-% to 15 wt-% of the silica nanoparticles.

The primer typically provides the surface coated thereon with a continuous network of acid-sintered silica nanoparticles agglomerates. The particles preferably have an average primary particle size of below 40 nanometers (preferably below 20 nanometers). The average particle size may be determined using transmission electron microscopy. As used herein, the term "continuous" refers to covering the surface of the substrate with virtually no discontinuities or gaps in the areas where the gelled network is applied. The term "network" refers to an aggregation or agglomeration of nanoparticles linked together to form a porous three-dimensional network. The term "primary particle size" refers to the average size of unagglomerated single particles of silica.

The term "porous" refers to the presence of voids between the silica nanoparticles created when the nanoparticles form a continuous coating. Preferably, the network has a porosity of 25 to 45 volume percent, more preferably 30 to 40 volume percent, when dried. In some embodiments the porosity may be higher. Porosity may be calculated from the refractive index of the coating according to published procedures such as in W. L. Bragg, A. B. Pippard, Acta Crystallographica, volume 6, page 865 (1953).

To uniformly coat a primer composition onto a hydrophobic substrate from an aqueous system it may be optionally desirable to increase the surface energy of the substrate and/or reduce the surface tension of the coating composition. The surface energy may be increased by oxidizing the substrate surface prior to coating using corona discharge or flame treatment methods. These methods may also improve adhesion of the coating to the substrate. Other methods capable of increasing the surface energy of the article include the use of primers such as thin coatings of polyvinylidene chloride (PVDC). Alternatively, the surface tension of the coating composition may be decreased by addition of lower alcohols ($C_1$ to $C_8$). In some instances, however, in order to improve the coating hydrophilicity for desired properties and to ensure uniform coating of the article from an aqueous or hydroalcoholic solution, it may be beneficial to add a wetting agent, which is typically a surfactant, to the primer composition.

The term "surfactant" as used herein describes molecules comprising hydrophilic (polar) and hydrophobic (non-polar) regions on the same molecule which are capable of reducing the surface tension of the coating solution. Useful surfactants may include those disclosed in U.S. Pat. No. 6,040,053 (Scholz et al.).

For typical concentrations of silica nanoparticles (e.g., 0.2 to 15 percent by weight relative to the total coating composition) most surfactants comprise less than 0.1 percent by weight of the coating composition, preferably 0.003 to 0.05 percent by weight.

Anionic surfactants in the primer coating composition are preferred when added to improve the uniformity of the resulting coatings. Useful anionic surfactants include those with molecular structures comprising (1) at least one hydrophobic moiety, such as $C_6$-$C_{20}$ alkyl, alkylaryl, and/or alkenyl groups, (2) at least one anionic group, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, tertiary amino salts, and the like. Representative commercial examples of useful anionic surfactants include sodium lauryl sulfate (available, for example, under the trade designations "TEXAPON L-100" from Henkel Inc., Wilmington, Del.; and "POLYSTEP B-3" from Stepan Chemical Co, Northfield, Ill.); sodium lauryl ether sulfate (available, for example, under the trade designation "POLYSTEP B-12" from Stepan Chemical Co., Northfield, Ill.); ammonium lauryl sulfate (available, for example, under the trade designation "STANDAPOL A" from Henkel Inc., Wilmington, Del.); and sodium dodecyl benzene sulfonate (available, for example, under the trade designation "SIPONATE DS-10" from Rhone-Poulenc, Inc., Cranberry, N.J.).

Where a primer does not include a surfactant or when improved coating uniformity is desirable, it may be beneficial to add another wetting agent in order to ensure uniform coating of a surface from an aqueous or hydroalcoholic solution. Examples of useful wetting agents include polyethoxylated alkyl alcohols (available, for example, under the trade designations "BRIJ 30" and "BRIJ 35 from ICI Americas, Inc.; and "TERGITOL TMN-6" SPECIALTY SURFACTANT" from Union Carbide Chemical and Plastics Co.), polyethoxylated alkylphenols (available, for example, under the trade designations, "TRITON X-100" from Union Carbide Chemical and Plastics Co., "ICONOL NP-70" from BASF Corp., Florham Park, N.J.); and polyethylene glycol/polypropylene glycol block copolymer (available, for example, under the trade designations "TETRONIC 1502 BLOCK COPOLYMER SURFACTANT", "TETRONIC 908 BLOCK COPOLYMER SURFACTANT", and "PLURONIC F38 BLOCK COPOLYMER SURFACTANT" from BASF Corp.). Generally the wetting agent is used in amounts of less than 0.1 percent by weight of the coating composition, preferably 0.003 to 0.05 percent by weight of the coating composition depending on the amount of silica nanoparticles. Rinsing or steeping the coated article in water may be desirable to remove excess surfactant or wetting agent.

Primers are preferably coated on a surface using conventional techniques, such as bar, roll, curtain, rotogravure, spray, or dip coating techniques. The preferred methods include bar and roll coating, or air knife coating to adjust thickness. In order to ensure uniform coating and wetting of the film, it may be desirable to oxidize the substrate surface prior to coating using corona discharge or flame treatment methods. Other methods capable of increasing the surface energy of the article include the use of primers such as polyvinylidene chloride (PVDC).

The primer is preferably applied in uniform average thicknesses varying by less than 200 angstroms (Å), and more preferably by less than 100 Å, in order to avoid visible interference color variations in the coating. The optimal average dry coating thickness is dependent upon the particular primer coating composition, but in general the average thickness of the coating is 100 Å to 10,000 Å, preferably 500 to 2500 Å, more preferably 750 to 2000 Å, and even more preferably 1000 to 1500 Å, as measured using an ellipsometer such as a Gaertner Scientific Corp. Model No. L115C. It should be noted, however, that while the average coating thickness is preferably uniform, the actual coating thickness can vary considerably from one particular point on the coating to another.

Primers can be coated on both sides of a substrate if desired. Alternatively, the primers may be coated on one side of the substrate.

Once coated, the primed article is typically dried at temperatures in a range from 20° C. to 150° C. in a recirculating oven. An inert gas may be circulated. The temperature may be increased further to speed the drying process, but care should be exercised to avoid damage to the substrate. For inorganic substrates, the cure temperature can be above 200° C. After the primer coating composition is applied to the substrate and dried, the coating comprises preferably from 60 to 95 percent by weight (more preferably from 70 to 92 percent by weight) of silica nanoparticles (typically agglomerated), from 0.1 to 20 percent by weight (more preferably from 10 to 25 percent by weight) tetraalkoxysilanes and optionally 0 to 5 percent by weight (more preferably from 0.5 to 2 percent by weight) surfactant, and optionally up to 5 percent by weight (preferably 0.1 to 2 percent by weight) wetting agent.

Substrates and Uses

Support backings or substrates, on which the silicone-based material is disposed can comprise a polymeric material, metal, paper, glass, or other transparent ceramic material. Examples of substrates include at least one of a polymeric film, a polymeric sheet, a molded polymeric part, a metal (including a metal surface) (e.g., vapor deposited metals)) such as aluminum or stainless steel, paper, an ultraviolet (UV) mirror, infrared (IR) mirror, a UV stable substrate, a glass (e.g., soda-lime glass, low-iron glass, borosilicate glass, or quartz (fused silica)) substrate, masonry (e.g., brick, stone, concrete, etc.), a portion (e.g., hood, door, roof, side panel, trunk, or bumper) of a car, a portion (e.g., wing or fuselage) of a plane, a portion (e.g., roof or side) of a train, a wind turbine blade (e.g., any exterior portion of a turbine blade including the leading edge of the blade), a solar photovoltaic module (including a flexible photovoltaic module and a concentrating photovoltaic module), a solar thermal panel, a boat hull, a mirror, a traffic sign, a display, a window (including an architectural window and an automobile window), a reinforcing scrim, a textile, a release liner, a transdermal skin patch, or a photo bio reactor liner. The substrate may be flat, curved or shaped. In some embodiments, the substrates are transparent (i.e., transmit at least 85% of incident light in at least a portion of the visible spectrum (400-700 nm wavelength). Transparent substrates may be colored or colorless.

Examples of polymeric substrates include polyester (e.g., polyethylene terephthalate (PET), polybutyleneterephthalate), cyclic olefin co-polymer (COC), fluoropolymers (e.g., ethylene tetrafluorethylene, polyvinylidene fluoride (PVDF), THV), polycarbonate, allyldiglycolcarbonate, polyacrylates, such as polymethyl methacrylate (PMMA), polystyrene, polysulfone, polyethersulfone, homo-epoxy polymers, epoxy addition polymers with polydiamines, polydithiols, polyethylene copolymers, fluorinated surfaces, cellulose esters (e.g., acetate and butyrate), crosslinked polyurethane, and acrylates. Combinations of such polymeric materials can be used if desired, including mixtures, blends, laminates, and the like. In some embodiments, the substrate is flexible and made from polyesters (e.g. polyethylene terephthalate (PET)), cyclic olefin co-polymer (COC), polyolefins (e.g., PP (polypropylene), PE (polyethylene) and PVC (polyvinyl chloride) are particularly preferred. The substrate can be formed into a film using conventional filmmaking techniques such as extrusion of the substrate resin into a film and optional uniaxial or biaxial orientation of the extruded film. Alternatively, the substrate can be in the form of a foam.

The support backing can also be chosen so as to dissipate static electricity. For example, the support backing can comprise one or more polymeric materials that enable support backing to dissipate static electricity. In order to dissipate static electricity, transparent support backing may also comprise an inherently static dissipative polymer (available, for example, under the trade designations "STATRITE X5091 POLYURETHANE" or "STATRITE M809 POLYMETHYL METHACRYLATE" from Lubrizol Corp., Wickliffe, Ohio). Alternatively, static dissipative salts (available, for example, under the trade designation "FC4400" from 3M Company, St. Paul, Minn.) can be blended into the polymer used to make the transparent support backing 65 (e.g., PVDF). Support backing can also be comprised of multiple layers.

Polymeric biaxial oriented UV mirrors can be used as the substrate. UV mirrors are known in the art and include a multilayer optical film constructed of alternating layers of a UV stabilized polyethylene terephthalate (PET) and a copolymer of methylmethacrylate and ethyl acrylate (co-PMMA) at thicknesses one quarter of the wavelength of the light they will reflect. This UV mirror has alternating polymer layers in the range of thicknesses that reflect UV light while passing visible light. UV mirrors can be made as described in U.S. Patent Application Publication Nos. 2009/0283133 and 2009/0283144.

Polymeric visible mirrors can be used as the substrate. Visible mirror are known in the art and include a biaxial oriented multilayer optical film constructed of alternating layers of a UV stabilized polyethylene terephthalate (PET) and a copolymer of methylmethacrylate and ethyl acrylate (co-PMMA) at thicknesses one quarter of the wavelength of the light they will reflect. The Visible mirror has alternating polymer layers in the range of thicknesses that reflect Visible light while passing IR light. Polymeric visible light mirrors can be made as described in U.S. Patent Application Publication Nos. 2009/0283133 and 2009/0283144.

Glass as part of a "silicone on glass" Fresnel lens can be used as a substrate herein. Fresnel lenses are lenses of large aperture and short focal length without the weight and volume of conventional lenses produced by breaking the lens into a set of concentric annular sections known as "Fresnel zones". Fresnel lenses are commonly used for concentrating sunlight onto solar photovoltaic or solar thermal modules although they have been and are used for many other applications. Fresnel lenses are often made out of polymethyl methacrylate (PMMA) and polycarbonate. "Silicone on glass" Fresnel lenses are more recent and comprise a structured silicone on glass. These Fresnel lenses offer the potential for increased durability and weatherability. The "silicone on glass" Fresnel lens may be improved, for example by the following process. The glass may be primed on one side using the nano-silica solution described herein and optionally coated on the opposite sun side of the glass with nano-silica solution described herein to reduce reflection and improve light capture. The primer may be baked to improve adhesion. A blend of non-functional poly(dimethylsiloxane) (PDMS) fluid and vinyl-functional PDMS fluid can be coated onto a Fresnel tooling surface so that the features are fully filled and a smooth PDMS blend surface results. The filled tooling can then be passed through an e-beam process which cross-links the PDMS fluid blend. A UV initiated, Pt catalyzed, addition cure silicone fluid tie layer such as described, for example, in Example 10, can optionally be applied in a very thin layer, to minimize cost, to the primed glass surface. This solution may be applied onto the glass with various techniques, such as roll coating, notch-bar coating, and screen-printing. The thickness of this layer can vary, although the cure dynamics are to be taken into account so that it does not cure prior to lamination but still cures quickly after lamination and UV exposure. Prior to curing of the silicone tie-layer, the silicone filled tooling film is laminated to the primed glass. This lamination step may involve a rolling bank of silicone to form at the lamination site. Registration of the tooling film pattern to the glass edges may need to be tightly controlled. The construction can then be irradiated with UV radiation from a standard H bulb or black light to initiate the silicone tie-layer cross-linking. In some embodiments, it may be desirable to heat or even partially cure the tie-layer prior to lamination to allow for a more rapid cure after exposure to the UV lamps. In some embodiments, it may be desirable to heat the silicone tie-layer after exposure to UV irradiation to accelerate cross-linking. After the UV-curable silicone tie-layer is sufficiently cross-linked, the Fresnel tooling can be removed leaving the e-beam cross-linked silicone Fresnel adhered to the glass sheet.

In some embodiment, an e-beam cross-linked silicone Fresnel lens can be made directly onto a primed film without the use of a separate silicone tie-layer. For example, a PDMS gum may be pressed between a polymethylmethacrylate (PMMA) Fresnel tool and sheet of polyethylene terephthalate (PET) primed with the nano-silica solution described herein. This construction may be passed through an e-beam process so that the radiation passes first through the PET surface. After the silicone gum is sufficiently cross-linked by the e-beam the PMMA tool may be removed leaving the e-beam cross-linked silicone Fresnel lens attached to the primed PET surface.

Polymeric IR mirrors can be used as the substrate. IR mirrors are known in the art and include a biaxial oriented multilayer optical film constructed of alternating layers of a UV stabilized polyethylene terephthalate (PET) and a copolymer of methylmethacrylate and ethyl acrylate (co-PMMA)

at thicknesses one quarter of the wavelength of the light they will reflect. This IR mirror has alternating polymer layers in the range of thicknesses that reflect IR light while passing visible light. Polymeric IR mirrors can be made as described in U.S. Patent Application Publication Nos. 2009/0283133 and 2009/0283144.

Broadband polymeric mirrors can be made by laminating visible polymeric mirrors to IR polymeric mirrors with silicone adhesive after each mirror has been coated with acidified nano-silica primer.

UV stable substrates known in the art can be used as the substrate. Examples include a film or part made from a polymer that generally maintains it's optical and mechanical properties during outdoor exposure to sunlight and the elements for a period of at least 10 years either through the addition of UV absorbers, anti-oxidants and hindered amine light stabilizers and/or through the polymer's intrinsic weatherability (e.g., fluoropolymers).

Solar photovoltaic modules known in the art can be used as the substrate. These can include a glass front surface of a module for rigid photovoltaic modules (e.g., crystalline silicon modules). For flexible photovoltaic modules that utilize thin-film technologies, the front surface substrate is generally a UV stable polymer film (e.g., ethylene tetrafluoroethylene).

Solar thermal modules known in the art can be used as the substrate. These capture thermal energy by collecting the suns energy and heating a fluid. Solar thermal modules are similar to photovoltaic modules in that they are generally rigid and have a glass front surface.

Reinforcing scrims known in the art can be used as the substrate. These include woven or non-woven fabric, that when impregnated with a resin and cured, provide improved dimensional stability and tensile properties by decreasing elongation and increasing strength of the resulting composite.

Textiles known in the art can be used as the substrate. These include directionally flexible materials made of a network of natural or artificial fibers which are often used to make clothes, bags, furniture, tents, umbrellas, etc.

The articles of the present invention can also be release liners, which provide a release effect against any type of a sticky material (e.g., an adhesive or a mastic). For example, the silicone-containing material can be an ultraviolet radiation curable controllable release composition as described in U.S. Pat. No. 5,217,805. This composition comprises poly-epoxypolysiloxane, silicone-free polyfunctional epoxide normally incompatible with the epoxypolysiloxane, and compatibilizing monofunctional epoxide. In another exemplary embodiment, a polysiloxane release material consists essentially of one or more polysiloxane fluids having a kinematic viscosity at 25° C. of no greater than 50,000 centistokes, e.g., between 5,000 and 50,000 centistokes, as described in PCT Application No. PCT/US2009/062608, filed Oct. 29, 2009, published as WO 2010/056546. In some embodiments, the polysiloxane material comprises a poly (dimethylsiloxane). In some embodiments, all polysiloxane materials in the composition are nonfunctional polysiloxanes. In some embodiments, each nonfunctional polysiloxane is a polysiloxane fluid having a kinematic viscosity at 25° C. of no greater than 50,000 centistokes (e.g., between 5,000 and 50,000 centistokes).

Exemplary Embodiments

1. A coated article comprising a substrate surface, a nanoparticle-containing primer disposed on the substrate surface, and a silicone-based material bonded to the nanoparticle-containing primer, wherein the nanoparticle-containing primer comprises agglomerates of silica nanoparticles, said agglomerates comprising a three-dimensional porous network of silica nanoparticles, and the silica nanoparticles being bonded to adjacent silica nanoparticles.

2. The coated article of embodiment 1, wherein the silica nanoparticles are spherical and have an average particle diameter of less than 40 nanometers.

3. The coated article of embodiment 1, wherein the silica nanoparticles are spherical and have an average particle diameter of less than 20 nanometers.

4. The coated article of embodiment 1, wherein the silica nanoparticles are spherical and have an average particle diameter of less than 10 nanometers.

5. The coated article of any one of embodiments 1 through 4, wherein the substrate surface comprises a metal surface, a glass surface, a ceramic surface, an organic polymeric surface, a UV stable polymer surface, a UV stable polymeric mirror film surface, a fluoropolymer film surface, a PVDF/PMMA polymer blend film surface, a paper surface, a fabric surface, or a combination thereof.

6. The coated article of any one of embodiments 1 through 5, wherein the nanoparticle-containing primer is 100 Å to 10,000 Å thick.

7. The coated article of any one of embodiments 1 through 6, wherein the silicone-based material is a surface-structured silicone-based material.

8. The coated article of any one of embodiments 1 through 6, wherein the silicone-based material has a smooth surface.

9. The coated article of any one of embodiments 1 through 8, wherein the silicone-based material is substantially free of catalysts and initiators.

10. The coated article of any one of embodiments 1 through 9, wherein the silicone-based material is a nonfunctionalized silicone-based material.

11. The coated article of any one of embodiments 1 through 10, wherein the silicone-based material is a polysiloxane.

12. The coated article of any one of embodiments 1 through 11, wherein the silicone-based material is a blend.

13. The coated article of embodiment 12, wherein the silicone-based material is a blend of fluorosilicone and a nonfluorinated silicone.

14. The coated article of any one of embodiments 1 through 13, wherein the silicone-based material is a release material.

15. The coated article of embodiment 1 through 13, wherein the silicone-based material is a pressure sensitive adhesive.

16. The coated article of any one of embodiments 1 through 13, wherein the substrate is glass and wherein the silicone-based material is part of a Fresnel lens.

17. The coated article of embodiment 16, wherein the glass substrate surface is a first major surface, wherein the substrate has a second, generally opposed major surface to the first major surface, wherein the second major surface of the glass substrate is coated with nanoparticles, wherein the silicone-based material has first and second, generally opposed major surfaces, wherein the second major surface of the silicone-based material is bonded to the nanoparticle-containing primer, and wherein the first major surface of the silicone-based material is surface-structured and cross-linked.

18. A laminated article comprising two substrates, a nanoparticle-containing primer layer disposed on one surface of each of the two substrates, and a silicone-based material bonded between the nanoparticle-containing primer layers, thereby forming a laminate.

19. The laminated article of embodiment 18, wherein the nanoparticle-containing primer comprises agglomerates of silica nanoparticles, said agglomerates comprising a three-dimensional porous network of silica nanoparticles, and the silica nanoparticles being bonded to adjacent silica nanoparticles.

20. The laminated article of embodiment 19, wherein the silica nanoparticles are spherical and have an average particle diameter of less than 40 nanometers.

21. The laminated article of any one of embodiments 18 through 20, wherein the silica nanoparticles are a mixture of spherical and nonspherical particles.

22. A method of coating a substrate surface, the method comprising:
applying a primer coating composition to the substrate surface to form a primed surface; wherein applying a primer coating composition to the substrate surface comprises:
contacting the substrate surface with a nanoparticle-containing coating composition, wherein the nanoparticle-containing coating composition comprises:
an aqueous dispersion having a pH of less than 5 comprising silica nanoparticles and an acid having a $pK_a$ of ≤3.5; and
drying the nanoparticle-containing coating composition to provide a silica nanoparticle primer coating on the substrate surface;
contacting the primed surface with a silicone-containing coating composition; and
curing the silicone-containing coating composition to form a crosslinked silicone-containing coating.

23. The method of embodiment 22, wherein the concentration of the silica nanoparticles is 0.1 wt-% to 20 wt-% in the nanoparticle-containing coating composition.

24. The method of embodiment 22 or embodiment 23, wherein the acid is selected from oxalic acid, citric acid, $H_3PO_4$, HCl, HBr, HI, $HBrO_3$, $HNO_3$, $HClO_4$, $H_2SO_4$, $CH_3SO_3H$, $CF_3SO_3H$, $CF_3CO_2H$, and combinations thereof.

25. The method of any one of embodiments 22 though 24, wherein the silica nanoparticles are spherical and have average particle diameters of less than 20 nanometers.

26. The method of any one of embodiments 22 through 25, wherein the nanoparticle-containing coating composition further comprises a tetraalkoxysilane.

27. The method of any one of embodiments 22 through 26, wherein the pH of the nanoparticle-containing coating composition is less than 3.

28. The method of any one of embodiments 22 through 27, wherein the nanoparticle-containing coating composition comprises 0.1 wt-% to 20 wt-% silica nanoparticles having an average particle diameter of 40 nm or less, and 0 to 20 wt-% silica nanoparticles having an average particle diameter of 50 nm or greater, wherein the total amount of silica nanoparticles is 0.1 wt-% to 20 wt-%.

29. A method of laminating two substrates, the method comprising:
applying a primer coating composition to one surface each of two substrates wherein applying a primer coating composition to one surface each of the two substrate surfaces comprises:
contacting the substrate surfaces with a nanoparticle-containing coating composition, wherein the nanoparticle-containing coating composition comprises: an aqueous dispersion having a pH of less than 5 comprising silica nanoparticles, and an acid having a $pK_a$ of ≤3.5;
drying the nanoparticle-containing coating composition to provide a silica nanoparticle primer coating on the substrate surfaces;
coating a silicone-based material between the two primed surfaces; and
curing the silicone-based material to form a laminate with crosslinked silicone adhering the primed surfaces of the two substrates.

30. A coated article comprising a substrate surface, a nanoparticle-containing primer disposed on the substrate surface, a silicone tie layer disposed on the nanoparticle-containing primer, and a silicone-based material bonded to the silicone tie layer, wherein the tie layer is at least one of UV or thermally cured, and wherein the nanoparticle-containing primer comprises agglomerates of silica nanoparticles, said agglomerates comprising a three-dimensional porous network of silica nanoparticles, and the silica nanoparticles being bonded to adjacent silica nanoparticles.

31. The coated article of embodiment 30, wherein the silica nanoparticles are spherical and have an average particle diameter of less than 40 nanometers.

32. The coated article of embodiment 30, wherein the silica nanoparticles are spherical and have an average particle diameter of less than 20 nanometers.

33. The coated article of embodiment 30, wherein the silica nanoparticles are spherical and have an average particle diameter of less than 10 nanometers.

34. The coated article of any one of embodiments 30 through 33, wherein the substrate surface comprises a metal surface, a glass surface, a ceramic surface, an organic polymeric surface, a UV stable polymer surface, a UV stable polymeric mirror film surface, a fluoropolymer film surface, a PVDF/PMMA polymer blend film surface, a paper surface, a fabric surface, or a combination thereof.

35. The coated article of any one of embodiments 30 through 34, wherein the nanoparticle-containing primer is 100 Å to 10,000 Å thick.

36. The coated article of any one of embodiments 30 through 35, wherein the silicone-based material is a surface-structured silicone-based material.

37. The coated article of any one of embodiments 30 through 35, wherein the silicone-based material has a smooth surface.

38. The coated article of any one of embodiments 30 through 37, wherein the silicone-based material is substantially free of catalysts and initiators.

39. The coated article of any one of embodiments 30 through 38, wherein the silicone-based material is a nonfunctionalized silicone-based material.

40. The coated article of any one of embodiments 30 through 39, wherein the silicone-based material is a polysiloxane.

41. The coated article of any one of embodiments 30 through 40, wherein the silicone-based material is a blend.

42. The coated article of embodiment 41, wherein the silicone-based material is a blend of fluorosilicone and a nonfluorinated silicone.

43. The coated article of any one of embodiments 30 through 42, wherein the silicone-based material is a release material.

44. The coated article of embodiment 30 through 42, wherein the silicone-based material is a pressure sensitive adhesive.

45. The coated article of any one of embodiments 30 through 42, wherein the substrate is glass and wherein the silicone-based material is part of a Fresnel lens.
46. The coated article of embodiment 45, wherein the silicone-based material has first and second, generally opposed major surfaces, wherein the second major surface of the silicone-based material is bonded to the nanoparticle-containing primer, and wherein the first major surface of the silicone-based material is surface-structured and cross-linked.
47. The coated article of either embodiment 45 or embodiment 46, wherein the glass substrate surface is a first major surface, wherein the substrate has a second, generally opposed major surface to the first major surface, wherein the second major surface of the glass substrate is coated with nanoparticles, wherein the silicone-based material has first and second, generally opposed major surfaces, wherein the second major surface of the silicone-based material is bonded to a silicone tie layer, and wherein the first major surface of the silicone-based material is surface-structured and cross-linked.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

A plate of glass with the dimension of 0.3 cm (0.13 inch) thick, 12.7 cm (5 inch) wide by 30.5 cm (12 inch) long had a 5.1 cm (2 inch) section across the width masked using an adhesive tape (obtained under the trade name "8402" from 3M Company, St. Paul, Minn.). A nano-silica primer was prepared consisting of a 5% by weight blend of a 70:30 weight ratio of a first colloidal silica (obtained under the trade designation "NALCO 1115 COLLOIDAL SILICA" from Nalco Chemical Company, Naperville, Ill.) and a second colloidal silica (obtained under the trade designation "NALCO 1050 COLLOIDAL SILICA" from Nalco Chemical Company) in $H_2O$, brought to a pH of 2.5-2.0 with $HNO_3$. The nano-silica primer was applied by wiping the surface of the glass with a small wipe (obtained under the trade designation "KIMTECH" from Kimberly-Clark, Roswell, Ga.) dampened with the nano-silica primer solution. The primer was allowed to dry at room temperature. The primer thickness was approximately 100 nm. The masking tape was removed leaving an un-primed section on the surface of the glass. A metal template 6.4 cm (2.5 inch) wide, 19.1 cm (7.5 inch) long and 0.16 cm (0.063 in) deep was placed over the glass plate so that 2.5 cm (1 inch) of the template was located over the unprimed portion of the glass. 10 grams of a thermal cure silicone (obtained under the trade name "SYLGARD 184" from Dow-Corning Corporation, Midland, Mich.) was mixed and poured into the template. The construction was placed into a 100° C. oven for 1 hour to cure.

As a comparative example, a second plate of glass coated with primer and silicone was prepared in the same manner above except that the glass was primed with an organic solvent-borne silicone primer (obtained under the trade designation "SS4120" from Momentive Performance Materials, Inc., Waterford, N.Y.) instead of the nano-silica primer.

As another comparative example, a third plate of glass was prepared in the same manner above except that the glass was not primed before applying the silicone.

After the samples were removed from the oven the template was removed resulting in a rectangle of silicone coated on top of the glass. 2.5 cm wide strips were cut along the length of the coated silicone. The section of the silicone coated over the un-primed area allows for an area to grip and peel the silicone strips. The glass plates were loaded onto a slip/peel tester (obtained under the trade designation "SP2000" from IMASS, Inc., Accord, Mass.) setup for 180° peel test. The samples were tested with a peel rate of 30.5 cm/min(12 in/min) and a 20 second peel time with a 4 second delay before averaging peel force.

The silicone on the glass plates with the SS4120 primer and without primer was able to be peel tested since the silicone peeled from the surface of the glass. The glass plate primed with the nano-silica primer of this invention was not able to peel test since the primer caused adhesion so strong that the silicone would not peel from the primed glass.

| Peel Test Result Table for Silicone on a Rigid Glass Substrate | |
| --- | --- |
| Primer Sample | Average Peel Force (g/cm) |
| No Primer | 13.4 |
| SS4120 Primer | 40.0 |
| Nano-Silica Primer | Could Not Peel/Adhesion Too Strong |

Example 2

A 250 micrometer thick polyethylene terephthalate (PET) film with the dimension of 0.6 cm (0.25 inch) thick, 10.2 cm (4 inch) wide by 15.2 cm (6 inch) long had a 5.1 cm (2 inch) section masked using an adhesive tape ("3M 8402"). A nano-silica primer was prepared consisting of a 5% by weight blend of a 70:30 weight ratio of a first colloidal silica ("NALCO 1115 COLLOIDAL SILICA") and a second colloidal silica ("NALCO 1050 COLLOIDAL SILICA") in $H_2O$, brought to a pH of 2.5-2.0 with $HNO_3$. The nano-silica primer was applied by wiping the surface with a small wipe ("KIMTECH") dampened with the nano-silica primer solution. The primer was allowed to dry at room temperature. The dry primer layer was approximately 100 nm thick. The masking tape was removed leaving an un-primed section on the surface of the PET. A metal template with the dimensions of 5.1 cm (2 inch) by 10.2 cm (4 inch) was placed over the PET sheet so that 2.5 cm (1 inch) of the template is located over the unprimed portion of the PET. 10 grams of a thermal cure silicone ("SYLGARD 184") was mixed and poured into the template. A 5.1 cm (2 inch) by 10.2 cm (4 inch) piece of glass fiber fabric was placed on top of and allowed to settle into the wet silicone. The PET and silicone construction was placed into a 100° C. oven for 1 hour to cure.

After the samples were removed from the oven the template was removed resulting in a rectangle of reinforced silicone coated on top of the PET. 2.5 cm wide strips were cut along the length of the coated silicone. The section of the silicone coated over the un-primed area allows for an area to grip and peel the silicone strips.

The PET film primed with the nano-silica primer of this invention was not able to peel test since the primer caused adhesion so strong that the silicone would not peel from the nano-silica primed PET and the reinforcing scrim was ripped from the silicone.

Example 3

A polymeric biaxial oriented multilayer optical film made according to Example 11 of U.S. Patent Application Publication No. 2009/0283144 with outer skins layers of 85% by weight polyethylene terephthalate glycol co-polyester (PETg) (obtained under the trade designation "EASTAR GN071" from Eastman Chemical Company, Kingsport, Tenn.) blended with 15% by weight UV absorber masterbatch (UVA) (obtained under the trade designation "UV MB TA07-07 MB02" from Sukano Products, Ltd., Schindellegi, Switzerland) was used in this example. The PETg/UVA surface of the film was primed with a nano-silica primer consisting of a 5% by weight blend of a 70:30 weight ratio of a first colloidal silica ("NALCO 1115 COLLOIDAL SILICA") and a second colloidal silica ("NALCO 1050 COLLOIDAL SILICA") in H2O, brought to a pH of 2.5-2.0 with $HNO_3$.

The nano-silica primer was applied using an air knife coating process to coat an approximately 100 nm layer of nano-silica to one PETg surface that was corona treated at a setting of 1.5 kW, the primer was then dried in an oven at temperatures from 21° C. (70° F.) to 107° C. (225° F.).

A second polymeric biaxial oriented multilayer optical film made according to Example 11 of U.S. Patent Application Publication No. 2009/0283144 with outer skin layers consisting of a resin blend of 35% by weight Polyvinylidene Fluoride (PVDF) (obtained under the trade designation "PVDF 6008" from Dyneon, LLC., St. Paul, Minn.) and 65% by weight Polymethylmethacrylate (PMMA) (obtained under the trade designation "CP-82" from Lucite International Inc., Southampton, United Kingdom) was used in this example. The nano-silica primer was applied using an air knife coating process to coat an approximately 100 nm layer of nano-silica to one PVDF/PMMA blend skin layer surface that was corona treated at a setting of 1.5 kW, the primer was then dried in an oven at temperatures from 21° C. (70° F.) to 107° C. (225° F.).

A PET film (available from 3M Co.) was coated with the nano-silica primer using an air knife coating process to coat an approximately 100 nm layer of nano-silica to one surface of the PET that was corona treated at a setting of 1.5 kW, the primer was then dried in an oven at temperatures from 21° C. (70° F.) to 107° C. (225° F.).

A 1 gram portion of a non-functional silicone gum (obtained under the trade name "EL POLYMER NA" from Wacker Chemical Corp, Adrian, Mich.) was weighed and formed into a round ball. The ball of silicone gum was placed between the primed surfaces of two PETg/UVA skin layer films cut to the dimensions of 10.2 cm by 10.2 cm. The silicone gum was pressed to a thickness of 125 micrometer between the films using an unheated platen press using a pressure of 48.3 MPa (7000 psi). The above was repeated for the PVDF/PMMA blend skin films and the PET film. For comparative samples, the above was also repeated for non-primed versions of the PETg/UVA skin film, PVDF/PMMA blend skin film and PET film.

The film and silicone construction were taped to a carrier web and passed through an electron beam at an acceleration voltage of 300 keV and a dose of 2 MRads to crosslink the silicone gum. The E-beam unit was a broadband curtain type electron beam processor (obtained from PCT Engineered Systems, LLC). The laminate samples were cut into 2.54 cm wide strips and tested using a tensile tester, (model number "1122" from Instron, Norwood, Mass.) setup for T-peel testing using a 90.7 kg (200 lb) load cell, peel rate of 15 cm/min and peel length of 4.4 cm.

| T-Peel Test Result Table for Films Laminated with Silicone | |
|---|---|
| Film Skin Material | Average T-Peel Force(g/cm) |
| Non-Primed PETg/UVA | 130 |
| Nano-Silica Primed PETg/UVA | 486 |
| Non-Primed PVDF/PMMA | 40 |
| Nano-Silica Primed PVDF/PMMA | 647 |
| Non-Primed PET | 153 |
| Nano-Silica Primed PET | 464 |

Example 4

Nano-silica primed and non-primed PVDF/PMMA blend skin film and PET film laminates were made according to Example 3 except a fluorosilicone gum, (obtained under the trade name "FSE2080" from General Electric Company, Waterford, N.Y.) was used instead EL Polymer NA silicone gum as the crosslinked lamination adhesive. The samples were tested in the same method according to Example 3.

| T-Peel Test Result Table for Films Laminated with Fluorosilicone | |
|---|---|
| Film Skin Material | Average T-Peel Force (g/cm) |
| Non-Primed PVDF/PMMA | 19 |
| Nano-Silica Primed PVDF/PMMA | 92 |
| Non-Primed PET | 77 |
| Nano-Silica Primed PET | 154 |

Example 5

A 10% by weight fluorosilicone gum ("FSE2080") and 90% by weight silicone gum ("EL POLYMER NA") blend was made by heating the two gum components to 250° C. and mixing them using a wooden rod. This heating, mixing cycle was repeated three times to ensure full mixing. Nano-silica primed and non-primed PVDF/PMMA skin film and PET film laminates were made according to Example 3 substituting the fluorosilicone/silicone gum blend for the pure EL Polymer NA silicone gum as the crosslinked lamination adhesive. The samples were tested in the same method according to Example 3.

| T-Peel Test Result Table for Films Laminated with Fluorosilicone/Silicone Gum Blend | |
|---|---|
| Film Skin Material | Average T-Peel Force (g/cm) |
| Unprimed PVDF/PMMA | 44 |
| Primed PVDF/PMMA | 369 |
| Unprimed PET | 97 |
| Primed PET | 344 |

Example 6

A sample suitable for use as a release liner could be made with improved adhesion to a polyester substrate and exhibiting improved wetting of the silicone release material. A polyethylene terephthalate (PET) film (obtained under the trade designation "Scotchpar" from 3M Company, St. Paul, Minn.) was coated with a primer consisting of a 5% by weight blend of a 70:30 weight ratio of a first colloidal silica ("NALCO 1115 COLLOIDAL SILICA") and a second colloidal silica (obtained "NALCO 1050 COLLOIDAL SILICA") in $H_2O$, brought to a pH of 2.5-2.0 with $HNO_3$.

The nano-silica primer was applied by wiping the surface with a small wipe ("KIMTECH") dampened with the nano-silica primer solution. The primer was applied at a dry thickness of approximately 100 nanometers. The primer was allowed to dry at room temperature. A silanol-terminated silicone fluid (obtained under the trade designation "DMS-S31" from Gelest, Inc, Morrisville, Pa.) was coated onto the primed surface of the PET film using a notch bar style coater with a gap set to 75 micrometers (0.003 inch). A non-primed PET was also coated with the silanol-terminated silicone fluid ("DMS-S31") using a notch bar coater with a gap set to 75 micrometers (0.003 inch). After coating it was immediately obvious that the nano-silica primed PET had better coating quality, which was characterized by a smoother surface of the silicone and fewer de-wet areas. The silicone coated samples could be crosslinked using electron-beam irradiation at an acceleration voltage of 300 keV and a dose of 36 MRad.

Example 7

A microstructured polypropylene film was made using an extrusion replication process. Polypropylene (obtained under the trade designation "FINA 7825" from Total Petrochemicals USA, Inc. Houston, Tex.) was extruded through a film extrusion die into a nip roll casting station consisting of one rubber roll and a machined roll with linear prismatic grooves having 54 degree peaks and valley with a 50 micrometer pitch. The polypropylene extrudate film quenches while against the machined roll forming a liner prism surfaced film, which was then wound into a roll.

A roll of 30.5 cm (12 inch) wide PET film was primed with an adhesion promoting nano-silica primer. The nano-silica primer consists of a 5% by weight blend of a 70:30 weight ratio of a first colloidal silica (obtained under the trade designation "NALCO 1115 COLLOIDAL SILICA" from Nalco Chemical Company, Naperville, Ill.) and a second colloidal silica (obtained under the trade designation "NALCO 1050 COLLOIDAL SILICA" from Nalco Chemical Company) in H$_2$O, brought to a pH of 2.5-2.0 with HNO$_3$. The primer was coated onto the PET film at a thickness of about 100 nanometers, and run through an oven at 21° C. (70° F.)-107° C. (225° F.) and then wound on a roll.

A non-functional silicone gum (obtained under the trade designation "EL POLYMER NA" available from Wacker Chemical Corp, Adrian, Mich.) was extruded from a 15.2 cm (6 inch) wide film extrusion die at 191° C. (375° F.) using a 5.1 cm (2 inch) diameter extruder (obtained under the trade designation "BONNOT EXTRUDER" from The Bonnot Company, Uniontown, Ohio). The gum was extruded directly into a nip roll casting station consisting of a metal chill roll and a rubber roll. Both the polypropylene tooling film and the nano-silica primed PET film were introduced into the nip while the silicone gum was extruded between them so that the polypropylene tooling film structures made intimate contact with the top surface of the extruded silicone gum and the nano-silica primed surface of the PET film was in intimate contact with the bottom surface of the extruded silicone gum. This film construction was then wound in to a roll. Sections of the film constructions 0.9 meter (3 feet) long were unwound and taped onto a carrier web that passed through an electron beam at an acceleration voltage of 300 keV and a dose of 3 MRads. The electron beam unit was a broadband curtain type electron beam processor (obtained from PCT Engineered Systems, LLC, Davenport, Iowa).

After irradiation, the polypropylene tooling film was removed leaving the reverse image in the surface of the crosslinked silicone film attached to the nano-silica primed PET film.

The silicone and tooling films were analyzed using a digital microscope which showed excellent replication of the tooling film surface in the crosslinked silicone gum film.

Example 8

A "silicone on glass" Fresnel lens was made that included silica nano-particles on two generally opposed major surfaces of the glass.

Low iron glass panels were cleaned with cleaner (obtained under the trade designation "ALCONOX" from Alconox, White Plains, N.Y.) and stored in deionized water. The cleaned glass was removed from the water bath and dried with a stream of compressed air. The dried glass was immersed and removed from a coating solution at a rate of 38 mm/min. The coating solution was an acidified (pH 2) aqueous nanosilica solution made up of a 1:1 blend of a first 3.0 wt % aqueous nanosilica solution obtained under the trade designation "SNOWTEX ST-OUP" from Nissan Chemical, Houston, Tex. and a second 3.0 wt. % aqueous nanosilica solution obtained under the trade designation "NALCO 1050 COLLOIDAL SILICA" from Nalco Chemical, Naperville, Ill.). Immediately upon removal from the solution, the coated glass was air dried for 5-10 minutes. The dried, coated glass was heated at 120° C. for 10 minutes, followed by a cooling period of 15 minutes before sintering at 550° C. for 5 minutes.

Uncured silicone (obtained under the trade designation "ELASTOSIL601" from Wacker Chemie AG, Munich, Germany) was then coated into a microreplicated tooling film having the inverse structure of the final lens. The microreplicated tooling film was fabricated using a diamond to cut a brass blank with a Fresnel lens pattern. A conventional UV-curable acrylate was coated onto the Fresnel lens pattern and then cured with a UV lamp to provide the microreplicated tooling film. The coating used the minimal amount to fill the tooling film while not allowing silicone on the tooling film land areas. This tooling with the uncured silicone was then laminated with a silicone roller onto the top surface of the coated glass. The construction was then allowed to cure by standing at 20° C. for 20 hours.

The average light transmission spectrum of the resulting article from 400 nm to 800 nm using spectrometer a (obtained under the trade designation "LAMDA 900" from Perkin Elmer, Waltham, Mass.). The resulting article had a 1.5%-2% increased light transmission over the Fresnel lens without the nanoparticle coating.

Example 9

Another "silicone on glass" Fresnel lens was made comprising an e-beam cured silicone.

Glass panels were provided and cleaned as described in Example 8, above. A nano-silica primer was applied to a major surface of the clean glass. The aqueous nano-silica primer contained a 5% by weight blend in water of a 70:30 weight ratio of a first colloidal silica (obtained under the trade designation "NALCO 1115 COLLOIDAL SILICA" from Nalco Chemical Company, Naperville, Ill.) and a second colloidal silica (obtained under the trade designation "NALCO 1050 COLLOIDAL SILICA" from Nalco Chemical Company), brought to a pH of 2.0 with HNO$_3$. The nano-silica primer was applied to a major surface of the glass panel by wiping the surface with a small wipe (obtained under the trade designation "KIMTECH" from Kimberley Clark, Irving, Tex.) dampened with the nano-silica primer solution. The primer was applied at a dry thickness of about 100 nanometers. The primer was allowed to dry at room temperature.

A silicone blend was made containing 50 wt. % non-functional poly(dimethylsiloxane) (PDMS) fluid (obtained under the trade designation "DMS-T43" from Gelest, Morrisville, Pa.) and 50 weight % of vinyl terminated silicone fluid (obtained under the trade designation "DMS-V42" from Gelest). The silicone blend was then coated into a microreplicated daylighting film (obtained under the trade designation "DLRP0022" from 3M Company, St. Paul, Minn.) using a notch bar coater set with a gap so that the tooling features were filled and a planar top surface resulted. The coated tooling film was passed open face through an e-beam process where it received a dose of 16 MRad through two passes at 8 MRad/pass at an acceleration voltage of 300 keV which fully cross-linked the silicone.

The resulting construction was laminated to the primed glass using a thin layer of a clear thermal-cure silicone elastomer (obtained under the trade designation "SYLGARD 184" from Dow Corning Corporation, Midland, Mich.). The thermal-cure silicone elastomer ("SYLGARD 184") was cured at 100° C. for one hour. After the silicone elastomer ("SYLGARD 184")-layer was cured, the tooling film was removed leaving the e-beam cured Fresnel structured silicone attached to the glass with the silicone elastomer ("SYLGARD 184") tie-layer.

Example 10

Another "silicone on glass" Fresnel lens was made that included a "photocured silicone tie layer".

A silicone blend was made containing 95 wt. % non-functional poly(dimethylsiloxane) fluid (obtained under the trade designation "DMS-T41.2" from Gelest) and 5 weight % of vinyl terminated silicone fluid (obtained under the trade designation "DMS-V41" from Gelest). The silicone blend was then coated into a microreplicated daylighting film ("DLRP0022"). The coated tooling film was passed open face through an e-beam process where it received a dose of 20 MRad through two passes at 10 MRad/pass at an acceleration voltage of 300 keV which fully cross-linked the silicone.

A two-part photocurable silicone was prepared as follows. The two-part mixture was formulated to be mixed in a 1:1 ratio of Part A to Part B to make the photocurable silicone.

Part A was prepared as follows. To a 22.7 liter (5 gallon) polyethylene pail (obtained from Consolidated Container Co. Ltd., Minneapolis, Minn.) was added 9.7 kg of a mixture of about 25% by weight vinyl MQ resin in a vinyl terminated poly(dimethylsiloxane) polymer (obtained under the trade designation "VQM-135" from Gelest, Inc.), 5.23 kg of a vinyl terminated poly(dimethylsiloxane) polymer (obtained under the trade designation "DMS-V22" from Gelest, Inc., Morrisville, Pa.), and 0.98 gram of trimethyl(methylcyclopentadienyl)platinum IV dissolved in 2 mL heptane (catalyst obtained from Strem Chemical Inc, Newburyport, Mass.). The resulting mixture was stirred using an overhead stirrer for 30 minutes until the mixture was homogeneous. The platinum catalyst concentration was designed to be 20 ppm platinum for the 2-part mixed formulation.

Part B was prepared as follows. To a 22.7 liter (5 gallon) polyethylene pail was added 9.7 kg of a mixture of about 25% by weight vinyl MQ resin in a vinyl terminated poly(dimethylsiloxane) polymer ("VQM-135"), 6.4 kg of a vinyl terminated poly(dimethylsiloxane) polymer ("DMS-V22"), and 1.39 kg of a silicon hydride containing cross-linker (obtained under the trade designation "DOW CORNING SYL-OFF 7678 Crosslinker" (Lot#0002623315 from Dow Corning Corporation). The resulting mixture was stirred using an overhead stirrer for 30 minutes until the mixture was homogeneous.

The "photocurable silicone tie layer" was coated onto a major surface of the glass prepared with the silica nanoparticle coating as described in Example 8. The filled tooling film was then laminated to the primed glass and partially cured via exposure to 350 nm UV lamps for 3 minutes through the glass side of the construction. The sample was then fully cured in an oven at 80° C. for 10 minutes. After the thermal cure step the tooling film was removed leaving the e-beam cured Fresnel structured silicone attached to the glass with the photocurable silicone tie-layer.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A coated article comprising a substrate surface, a nanoparticle-containing primer disposed on the substrate surface, and a silicone-based material bonded to the nanoparticle-containing primer, wherein the substrate is glass, wherein the silicone-based material is part of a Fresnel lens, and wherein the nanoparticle-containing primer comprises an acid having a pKa of <3.5 and agglomerates of silica nanoparticles, said primer providing a continuous three-dimensional porous network of acid-sintered silica nanoparticles, and the silica nanoparticles being bonded to adjacent silica nanoparticles.

2. The coated article of claim 1, wherein the silica nanoparticles have an average primary particle diameter of less than 40 nanometers.

3. The coated article of claim 1, wherein the nanoparticle-containing primer is 100 Å to 10,000 Å thick.

4. The coated article of claim 1, wherein the silicone-based material is substantially free of catalysts and initiators.

5. The coated article of claim 1, wherein the silicone-based material is non-tackified.

6. The coated article of claim 1, wherein the silicone-based material is a surface-structured silicone-based material.

7. A coated article comprising a substrate surface, a nanoparticle-containing primer disposed on the substrate surface, a silicone tie layer disposed on the nanoparticle-containing primer, and a silicone-based material bonded to the silicone tie layer, wherein the substrate is glass, wherein the silicone-based material is part of a Fresnel lens, wherein the tie layer is at least one of UV or thermally cured, and wherein the nanoparticle-containing primer comprises an acid having a $pK_a$ of <3.5 and agglomerates of silica nanoparticles, said primer providing a continuous three-dimensional porous network of acid-sintered silica nanoparticles, and the silica nanoparticles being bonded to adjacent silica nanoparticles.

8. The coated article of claim 7, wherein the silica nanoparticles have an average primary particle diameter of less than 40 nanometers and wherein the nanoparticle-containing primer is 100 Å to 10,000 Å thick.

9. The coated article of claim 7, wherein the silicone-based material is substantially free of catalysts and initiators.

\* \* \* \* \*

UNITED STATES PATENT AND TRADEMARK OFFICE
CERTIFICATE OF CORRECTION

PATENT NO. : 10,066,109 B2
APPLICATION NO. : 13/642341
DATED : September 4, 2018
INVENTOR(S) : Pett et al.

Page 1 of 1

It is certified that error appears in the above-identified patent and that said Letters Patent is hereby corrected as shown below:

In the Specification

<u>Column 5</u>
Line 61, Delete "is which" and insert -- which is --, therefor.

<u>Column 15</u>
Line 11 (Approx.), Delete "tetrafluorethylene," and insert -- tetrafluoroethylene, --, therefor.

In the Claims

<u>Column 28</u>
Line 38, In Claim 1, delete "pKa" and insert -- $pK_a$ --, therefor.

Signed and Sealed this
Sixteenth Day of April, 2019

Andrei Iancu
*Director of the United States Patent and Trademark Office*